US008750427B1

(12) United States Patent
Singh et al.

(10) Patent No.: US 8,750,427 B1
(45) Date of Patent: Jun. 10, 2014

(54) APPARATUS AND METHOD FOR DEMODULATION OF FSK SIGNALS

(71) Applicant: Honeywell International Inc., Morristown, NJ (US)

(72) Inventors: Harvinder Singh, Karnataka (IN); Abdul Hakim, Karnataka (IN); Srikanth K.S, Karnataka (IN); Harinath Babu M R, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/678,954

(22) Filed: Nov. 16, 2012

(51) Int. Cl.
  *H03D 3/00* (2006.01)
(52) U.S. Cl.
  USPC .......................................... 375/334
(58) Field of Classification Search
  USPC ........... 375/271–272, 334–335; 329/300, 303
  See application file for complete search history.

(56) References Cited

U.S. PATENT DOCUMENTS

| 4,716,376 | A  | * | 12/1987 | Daudelin ........................ 329/300 |
| 5,450,032 | A  | * | 9/1995 | Mimura et al. ................ 329/300 |
| 6,035,177 | A  | * | 3/2000 | Moses et al. ..................... 725/22 |
| 6,937,666 | B2 | * | 8/2005 | Pasternak et al. ............. 375/272 |
| 7,372,914 | B2 | * | 5/2008 | Calvin ........................... 375/272 |
| 2007/0053466 | A1 | * | 3/2007 | Klostermann ................ 375/316 |
| 2009/0168857 | A1 |   | 7/2009 | Golborne et al. |

OTHER PUBLICATIONS

Dennis Seguine, PSoC® 1—Simplified FSK Detection, www.cypress.com, Document No. 001-15224 Rev. *D, 2007-2011.

* cited by examiner

*Primary Examiner* — Khanh C Tran
(74) *Attorney, Agent, or Firm* — Husch Blackwell LLP

(57) ABSTRACT

An apparatus and method for demodulation of FSK signals are provided. Digital pulses of the FSK signals can be processed to detect digital data contained in the FSK frequencies by converting the FSK frequencies from a frequency signal to a digital logic signal and vice versa.

18 Claims, 11 Drawing Sheets

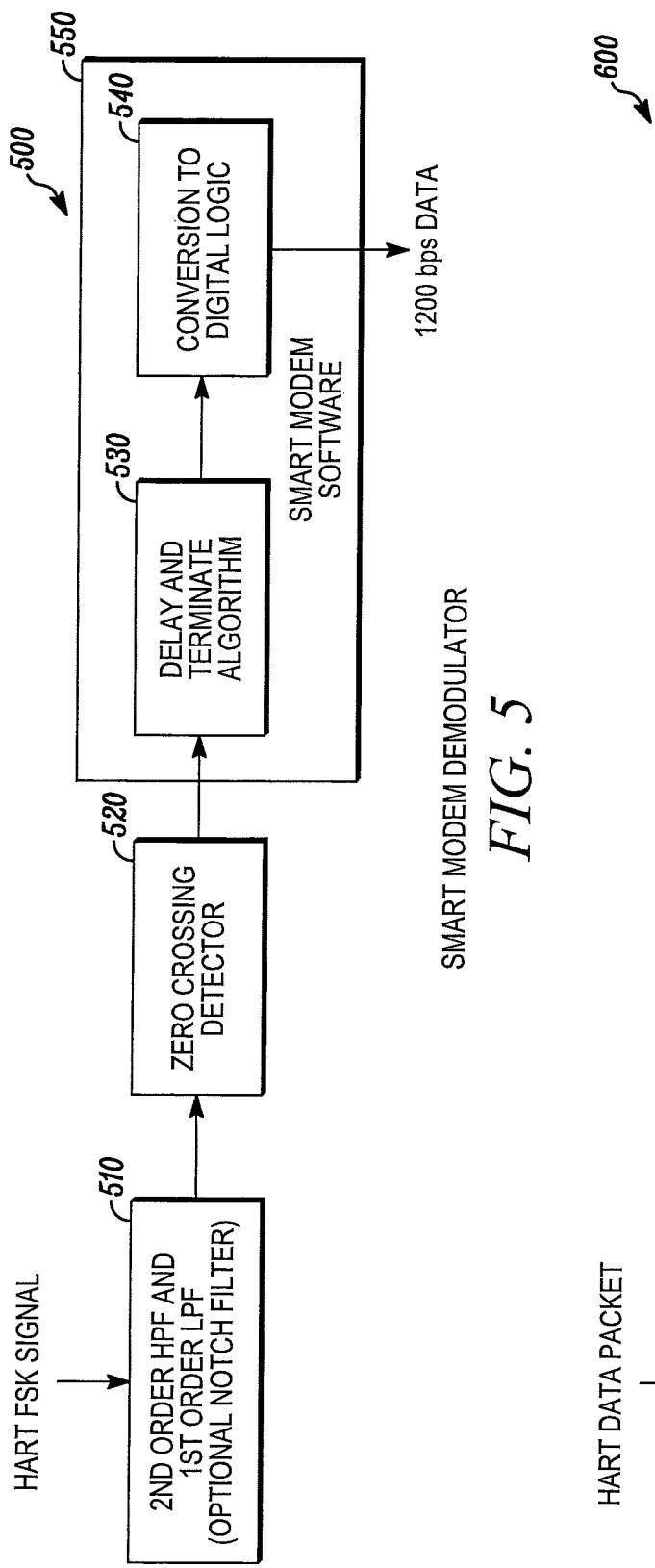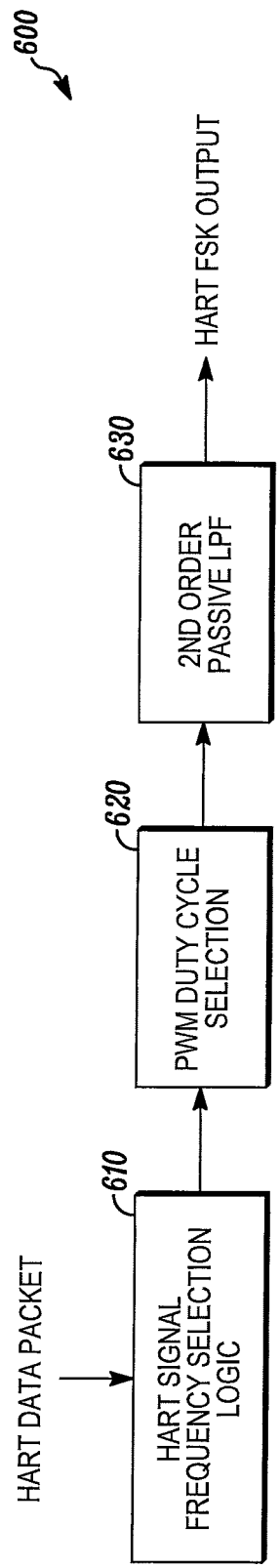
FIG. 5
FIG. 6

TIMING DIAGRAM - HART SIGNAL CONVERSION

TIMING DIAGRAM - CONVERSION TO DIGITAL LOGIC DATA

SMART MODEM IMPLEMENTATION ON APPLICATION PROCESSOR

SMART MODEM IMPLEMENTATION ON STANDALONE LOW COST PROCESSOR

APPARATUS AND METHOD FOR DEMODULATION OF FSK SIGNALS

FIELD

The present invention relates generally to process control systems. More particularly, the present invention relates to an apparatus and method for modulating and demodulating an FSK signal, for example, a HART FSK signal.

BACKGROUND

Detectors used in industrial automation are becoming smarter due to advancement in technology. For example, field devices used in industrial automation can communicate process variables using a current loop, and a controller can sense the current and interpret the process variable. When an analog signal is used, only one process variable can be transmitted. However, a digital signal can communicate information using frequency shift keying superimposed on an analog signal, thus increasing the number of process variables that can be sent to a controller using an existing analog signal line.

Most of detectors known in the art support standard protocols recommended by the industry, but these protocols pose a constraint on the manufacturer of the detector. For example, the manufacturer must use sophisticated chips to implement the standard protocols recommended by the industry, and these sophisticated chips can add to the overall cost of the detector. Furthermore, the protocols must comply with a set of physical layer specifications so that the digital communication superimposed on the analog line does not disturb the overall network of field devices and/or the controller.

HART (Highway Addressable Remote Transducer) protocol is one example of a widely accepted and implemented communication protocol that is commonly used in the instrumentation and process control industry. The HART protocol is used to communicate digital data and uses an FSK (Frequency Shift Keying) signal of 1200 Hz and 2200 Hz traveling on a conventional 4-20 mA current loop.

Devices that communicate via the HART protocol must decode and generate FSK signals. Therefore, the integration and implementation of HART capability in these devices is essential. However, modern circuitry that implements and is compliant with the HART protocol can be very expensive, especially in the demodulation section of the modem.

Various techniques have been tried to reduce the cost of the HART modem. For example, some techniques have employed a dedicated HART modem IC. Other techniques and approaches for decoding FSK signals have been software-based and FPGA/CPLD-based. However, each of these known techniques presents drawback and disadvantages.

One previously proposed technique is disclosed in Application Note 2336 titled "Simplified FSK Detection" ("AN 2336"). AN 2336 discloses a technique for and implementation of a dedicated HART modem IC in a PSoC® platform, and FIG. 1 is a block diagram of a demodulator as disclosed in AN2336. The technique and implementation disclosed in AN2336 and shown in FIG. 1 is both CPU-intensive and costly. For example, if implemented with microcontroller software, such a technique can utilize most CPU processing power. Furthermore, the comparator circuit, as seen in FIG. 1, can add to the overall cost of the demodulator.

Another previously proposed technique is disclosed in U.S. Publication No. 2009/0168857 titled "Micro-Controller With FSK Modem" ("the '857 publication"). The technique disclosed in the '857 publication is primarily based on counting the number of zero crossing instances in a given time period, and FIG. 2 is a block diagram of the method disclosed in the '857 publication. One of the drawbacks of the technique and implementation disclosed in the '857 publication is that they are CPU-intensive.

Yet another previously proposed technique is the A5191HRTL HART modem IC manufactured by ON Semiconductor. The A5191HRTL HART modem IC has been widely used in the industry to add HART capability to products, and FIG. 3 is a circuit block diagram of the implemented IC. As seen in FIG. 3, the implementation of this technique requires the use of an A5191 IC and various other discrete components. Accordingly, this technique and implementation is extremely costly.

In view of the above, there is a continuing, ongoing need for an improved apparatus and method for demodulation of FSK signals.

BRIEF DESCRIPTION OF THE DRAWINGS

FIG. 5 is a functional block diagram of a demodulator in accordance with disclosed embodiments;

FIG. 6 is a functional block diagram of a modulator in accordance with disclosed embodiments;

DETAILED DESCRIPTION

Figure 1:
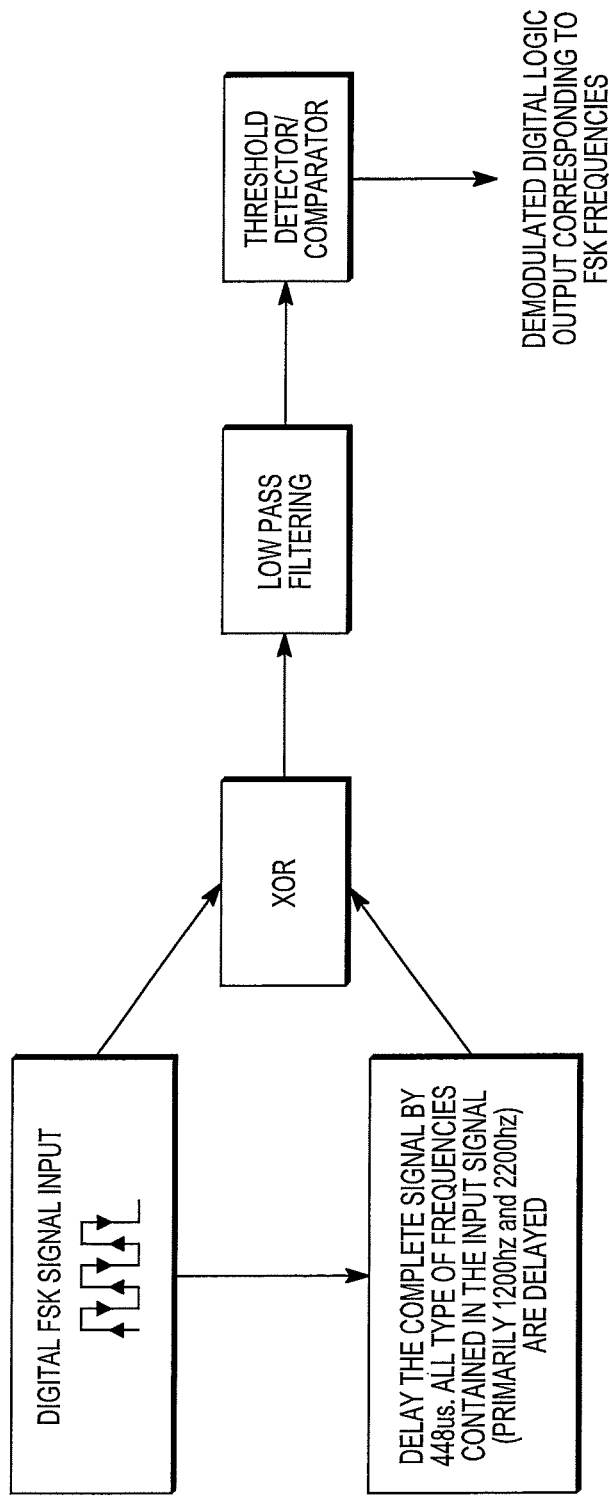
FIG. 1 is a block diagram of a demodulator as known in the art.
Figure 2:
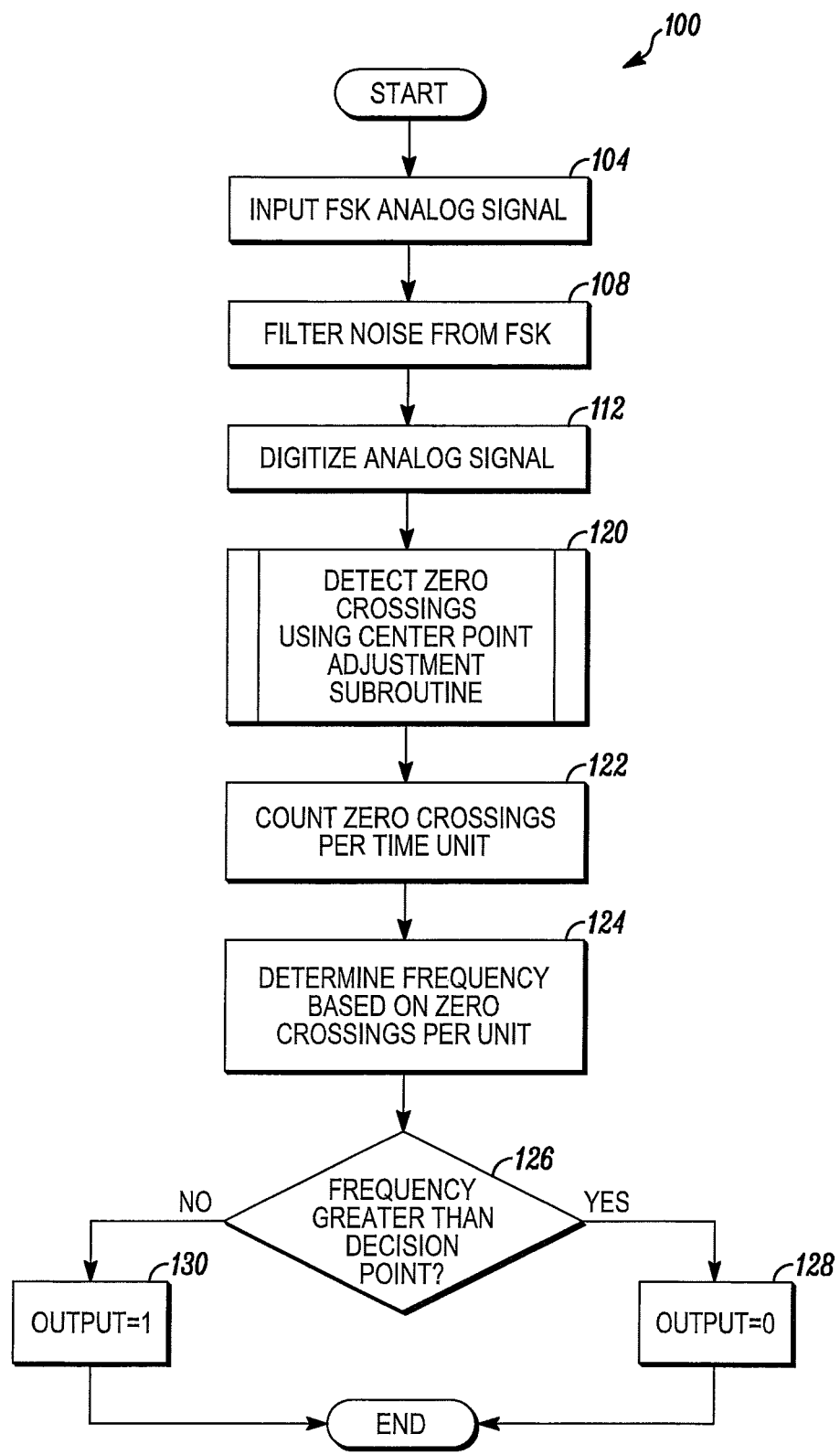
FIG. 2 is a block diagram of a method for demodulating an FSK signal as known in the art.
Figure 3:
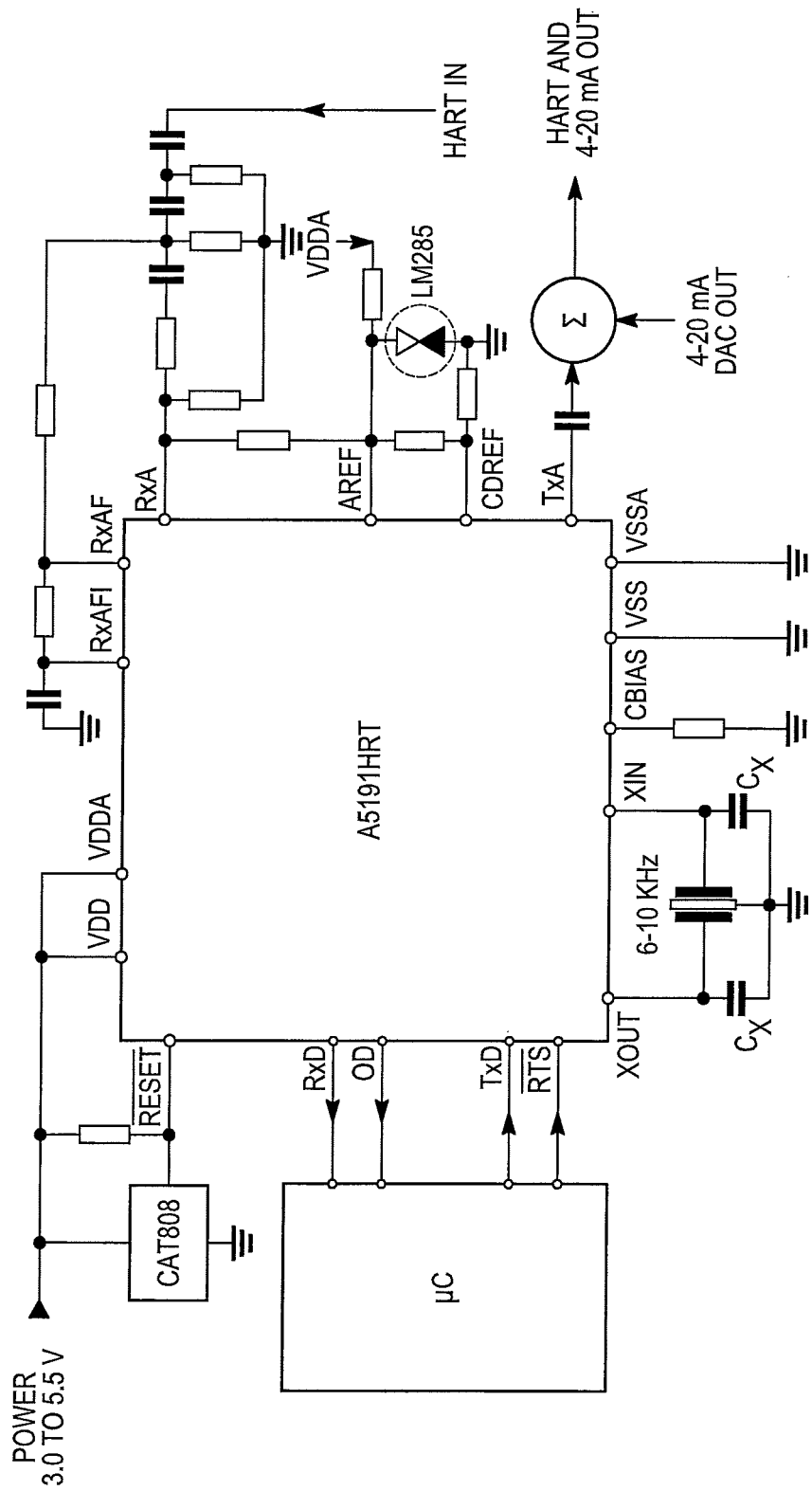
FIG. 3 is a circuit block diagram of a HART modem IC as known in the art.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include an improved apparatus and method for demodulation of FSK signals. For example, FSK signals having fundamental frequencies of 1200 Hz and 2200 Hz can be demodulated, as per HART standards. The apparatus and method disclosed herein can use and consume less CPU processing power and memory than in known systems and methods. The apparatus and method disclosed herein can also contribute to cost savings.

Some embodiments disclosed herein can be implemented with executable control software stored on a non-transitory computer readable medium. Some embodiments disclosed herein can also eliminate a dedicated modem IC and, instead, employ filters and limit comparators. These embodiments can be both CPU and cost-friendly. For example, embodiments disclosed herein can minimize the use of a microcontroller's memory, peripherals, and processing and can also minimize the number of hardware parts employed, thus, minimizing costs.

Embodiments disclosed herein can process digital pulses of an FSK signal to detect digital data contained in the FSK frequencies. For example, in some embodiments disclosed herein, the HART protocol can define 1200 Hz and 2200 Hz as frequencies that represent logic 1 and logic 0, respectively. For communication purposes, these frequencies can be converted from a frequency signal to a digital logic signal and vice versa. In some embodiments, a modem, for example, a HART modem, can be used to execute such a conversion.

Figure 4:
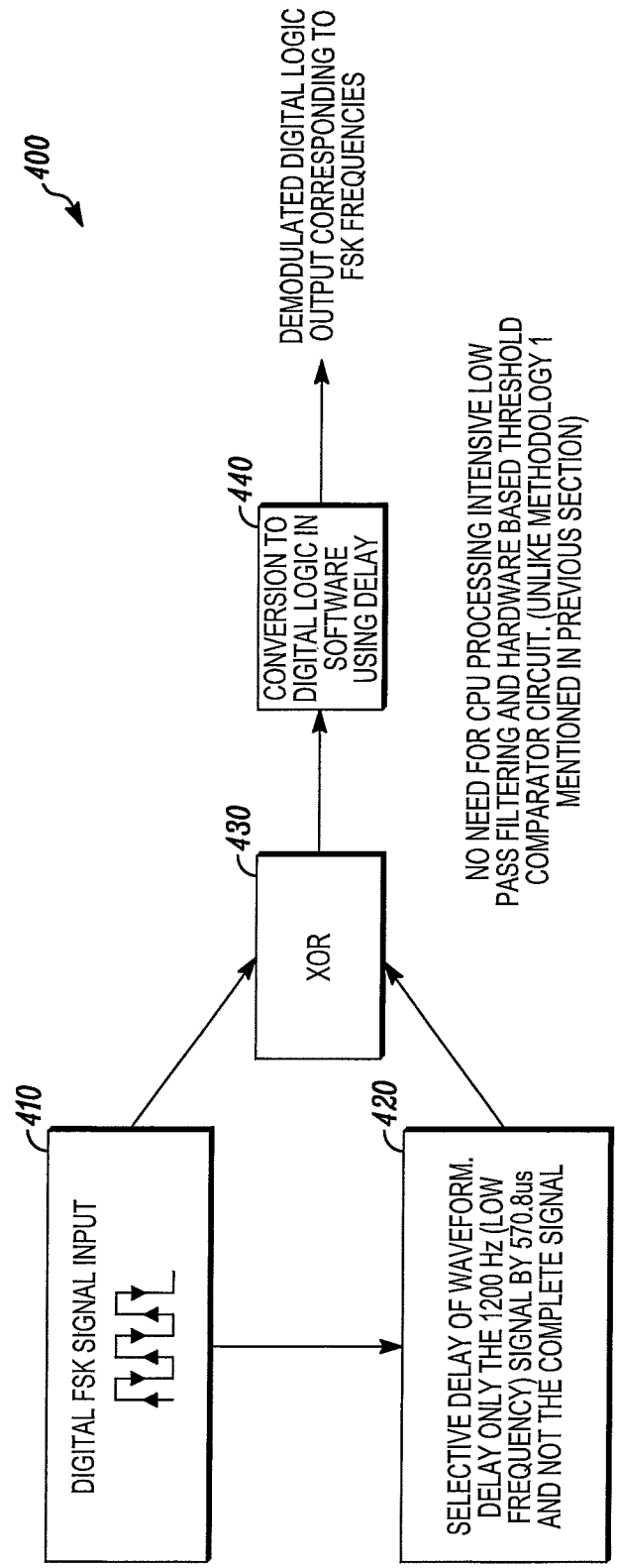
FIG. 4 is a block diagram of a diagram in accordance with disclosed embodiments.

FIG. 4 is a block diagram of a demodulator 400 in accordance with disclosed embodiments. As seen in FIG. 4, FSK pulses 410, for example, HART FSK pulses, can be delayed as in 420. In embodiments disclosed herein, one frequency can be delayed while the phase of the second frequency can be retained. In exemplary embodiments that employ 1200 Hz and 2200 Hz frequencies, as per the HART standard, the delay time of the low frequency signal can be approximately 578.7 µs. However, embodiments disclosed herein are not so limited. For example, if different frequencies are to be demodulated, then the delay time would vary accordingly. After the delay as in 420, the delayed signal can be XORed with the parent signal as in 430 before conversion to digital logic as in 440.

FIGS. 5 and 6 are functional block diagrams of a demodulator 500 and modulator 600, respectively, in accordance with disclosed embodiments. As seen in FIG. 5, an FSK signal, for example, a HART FSK signal, can be processed through the demodulator 500 and pass through four functional blocks 510, 520, 530, 540 to be demodulated.

In some embodiments, functional blocks 510, 520 can be implemented with hardware and/or in software stored on a non-transitory computer readable medium. For example, in some embodiments, functional block 510 can include hardware filters that remove out-of-band interference from an incoming HART FSK signal. In some embodiments, functional block 510 can include a 2nd order active HPF (high pass filter) and a 1st order passive LPF (low pass filter). In exemplary embodiments that employ 1200 Hz and 2200 Hz frequencies, the HPF can have a cutoff frequency of approximately 900 Hz, and the LPF can have a cutoff frequency of approximately 2400 Hz. However, embodiments disclosed herein are not so limited. For example, if different frequencies are to be demodulated, then the cutoff frequencies of the HPF and the LPF would vary accordingly.

In some embodiments, functional block 510 can include a passive notch filter for improved in-band noise rejection. The filtered signal that exits functional block 510 can pass through functional block 520, which can include a zero crossing detector. In some embodiments, functional block 520 can convert sine wave signals to digital pulses.

In some embodiments, functional blocks 530, 540 can form a smart modem 550 and can be implemented with executable control software stored on a non-transitory computer readable medium. The digital pulses that exit functional block 520 can be fed to a microcontroller GPIO pin that is capable of issuing interrupts on rising and falling edges of a signal.

Figure 7:
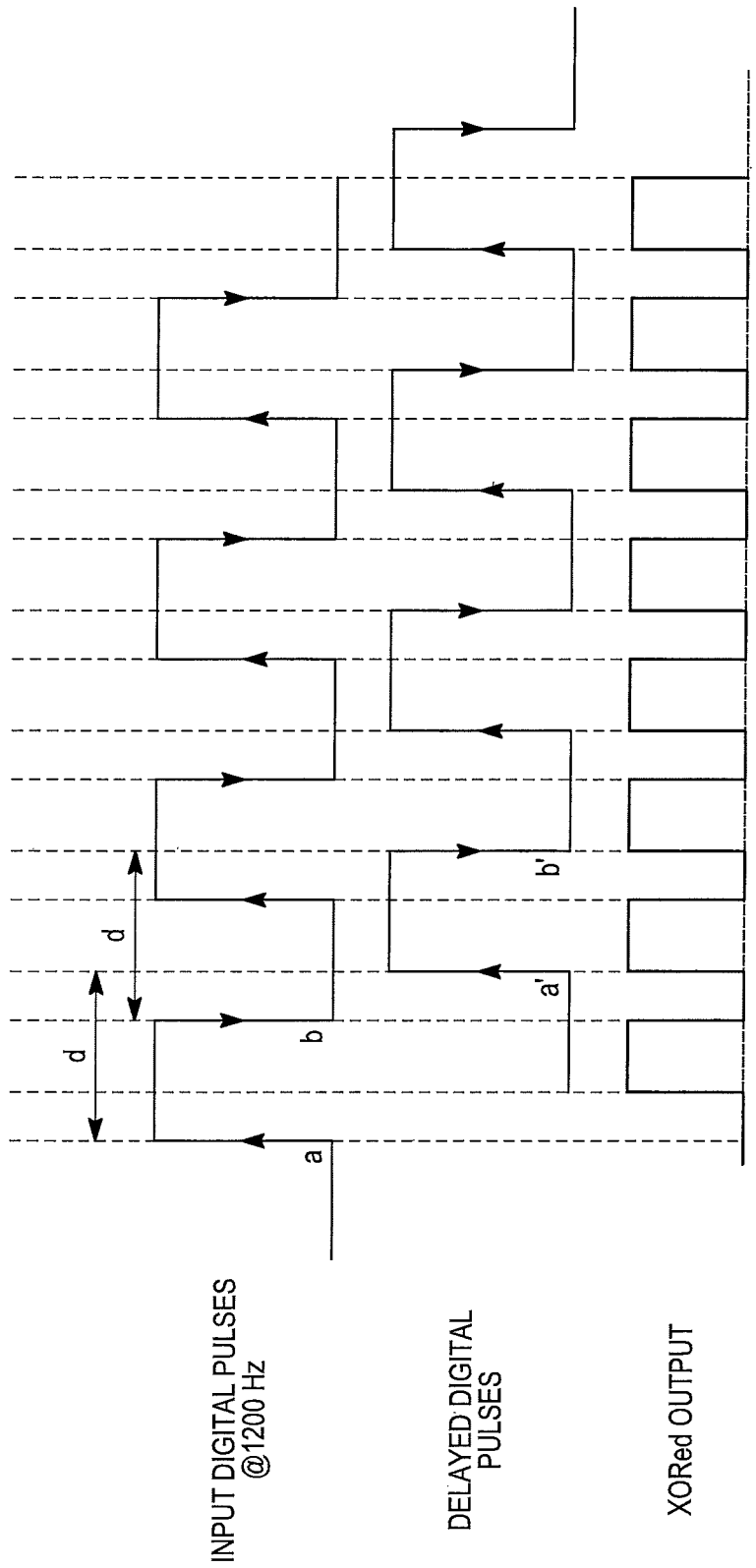
FIG. 7 is a timing diagram for a demodulator in accordance with disclosed embodiments.
Figure 8:
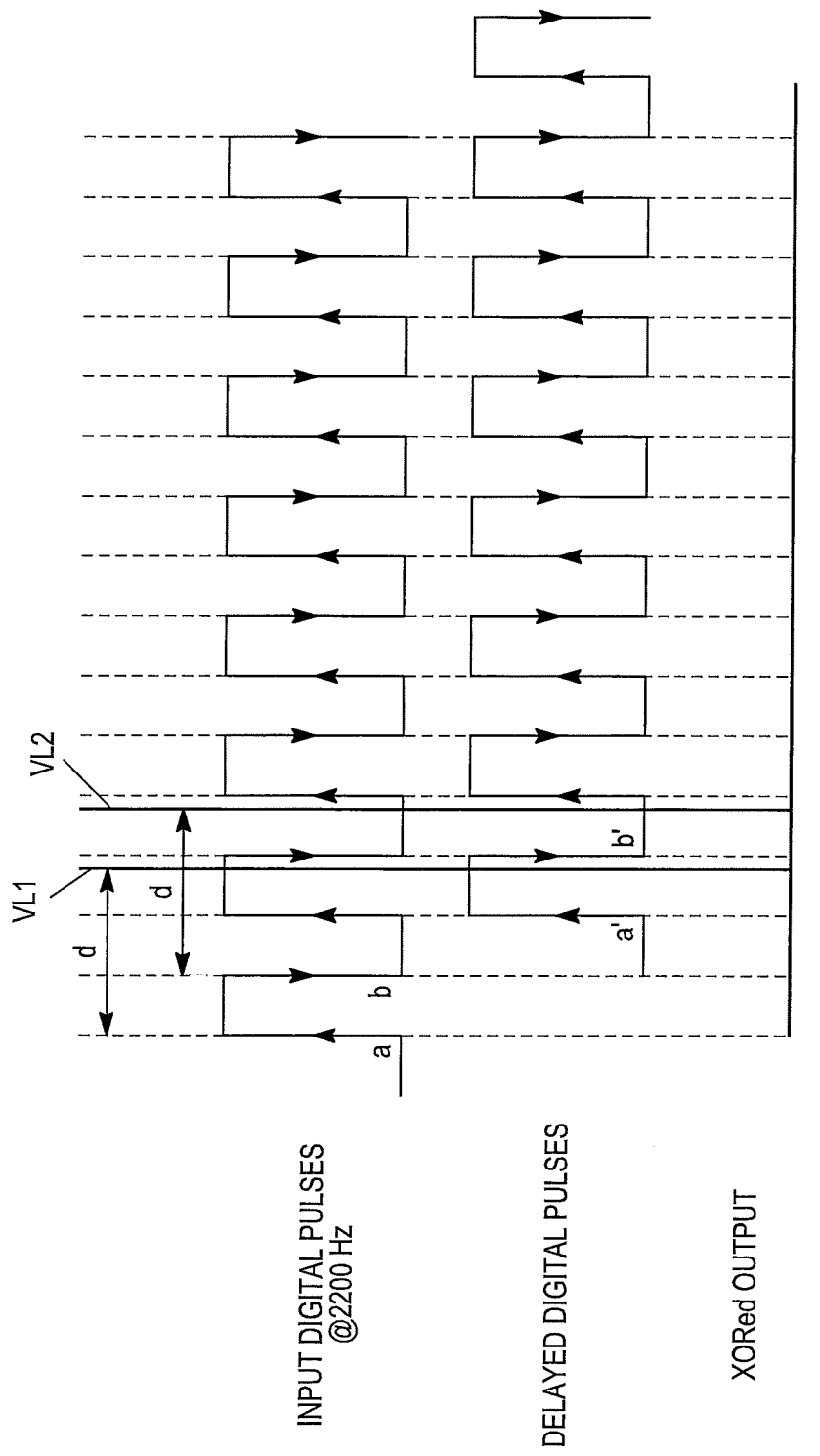
FIG. 8 is a timing diagram for a demodulator in accordance with disclosed embodiments.
Figure 9:
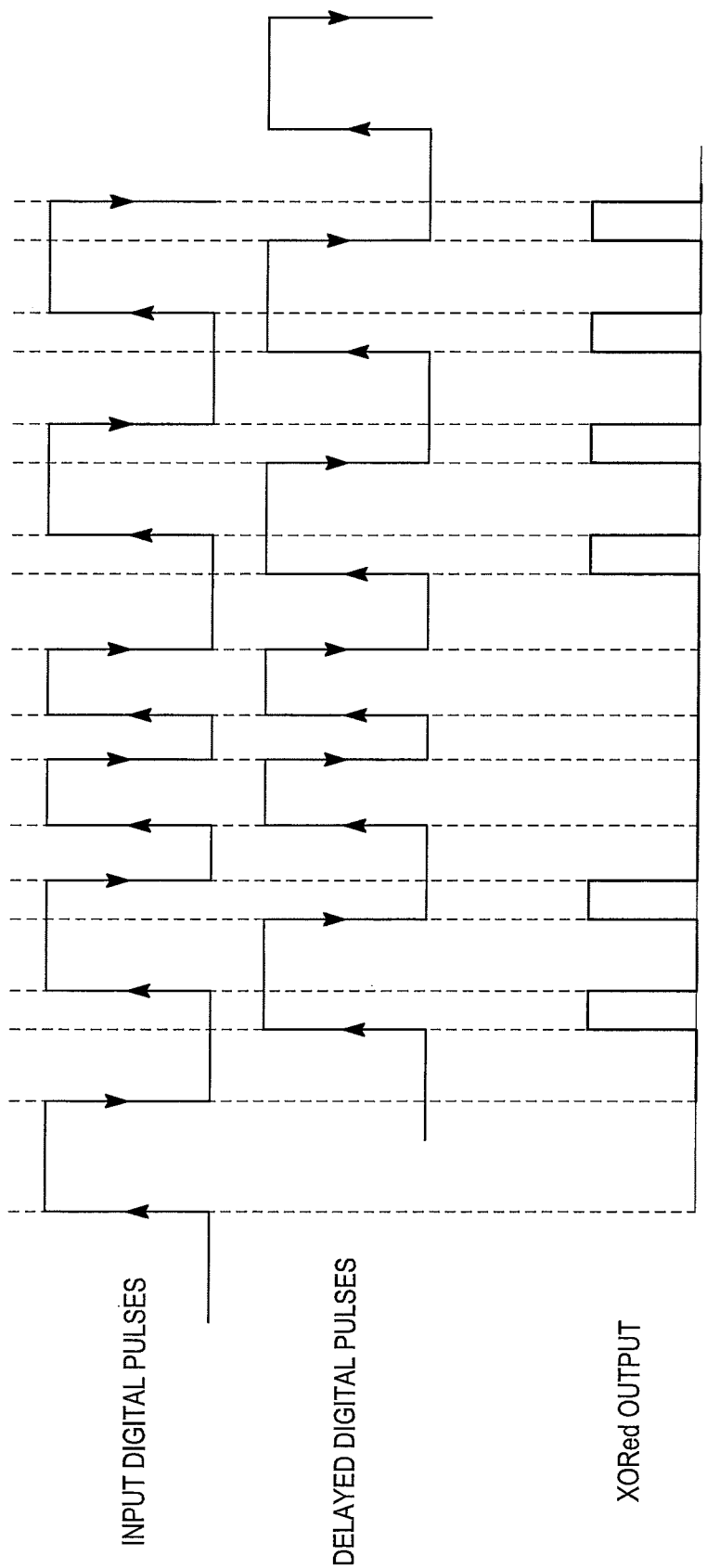
FIG. 9 is a timing diagram for a demodulator in accordance with disclosed embodiments.

For example, FIGS. 7-9 are timing diagrams that depict the processing involved in functional block 530. Exemplary embodiments disclosed herein can employ HART FSK signals, and HART FSK signals can consist of both 1200 Hz and 2200 Hz signals. Accordingly, FIG. 7 is a timing diagram for a 1200 Hz signal, and FIG. 8 is a timing diagram for a 2200 Hz signal.

Functional block 530 can execute various steps for each of the 1200 Hz and 2200 Hz signal. For example, first, a GPIO hardware interrupt can trigger an ISR (Interrupt Service Routine) at edge rising a. Then, a first variable can be updated with a state of the input waveform.

When the hardware interrupt triggers the ISR, a timer, for example, a timer located inside hardware associated with the ISR, can be set to predetermined delay time d and be started. In exemplary embodiments that employ HART FSK signals, delay time d can be approximately 578.7 µs. After expiration of delay time d, the timer can trigger the ISR. Then, edge a can be reproduced as edge a', and a second variable can be updated with a state of the delayed waveform.

The first variable corresponding to the state of the input waveform can be XORed with the second variable corresponding to the state of the delayed waveform. Then, the output of the XOR can be stored as a third variable.

The process described above can be repeated for falling edge b. For example, a GPIO hardware interrupt can also trigger an ISR at falling edge b. Then, a fourth variable can be updated with a state of the input waveform.

When the hardware interrupt triggers the ISR, the ISR timer can be set to predetermined delay time d and be started. After expiration of delay time d, the timer can trigger the ISR. Then, edge b can be reproduced as edge b', and a fifth variable can be updated with a state of the delayed waveform.

The fourth variable corresponding to the state of the input waveform can be XORed with the fifth variable corresponding to the state of the delayed waveform. Then, the output of the XOR can be stored as a sixth variable.

In embodiments disclosed herein, if the timer has been set to delay time d for rising edge a and delay time d has not yet expired before another rising edge interrupt is detected, then edge a can be reproduced as edge a', and the second variable can be updated with the state of the delayed waveform, even though the timer has not yet triggered the ISR. Then, when the GPIO hardware interrupt triggers the ISR at rising edge a, the first variable can be updated with the state of the input waveform, and the ISR timer can be set to delay time d.

Similarly, if the timer has been set to delay time d for falling edge b and delay time d has not yet expired before another falling edge interrupt is detected, then edge b can be reproduced as edge b', and the fifth variable can be updated with the state of the delayed waveform, even though the timer has not yet triggered the ISR. Then, when the GPIO hardware interrupt triggers the ISR at falling edge b, the fourth variable can be updated with the state of the input waveform, and the ISR timer can be set to delay time d.

As seen in FIG. 7, when the input waveform is a 1200 Hz signal, the XORed output of functional block 530 can vary between logic 1 and logic 0. However, the XORed output is different when the input waveform is a 2200 Hz signal. For example, as seen in FIG. 8, when the input waveform is a 2200 Hz signal, the XORed output of functional block 530 can be logic 0 at all times.

As further seen in FIG. 8, the delayed waveform of a 2200 Hz signal is not delayed by delay time d. Instead, the delayed waveform is terminated before delay time d is completed. The vertical lines VL1, VL2 in FIG. 8 illustrate that the time delay between a and a' and between b and b' is less than delay time d.

In accordance with the above, FIG. 9 is a timing diagram for signal conversion. As seen in FIG. 9, a higher frequency is converted to logic 0 and a lower frequency is converted to a train of pulses.

Figure 10:
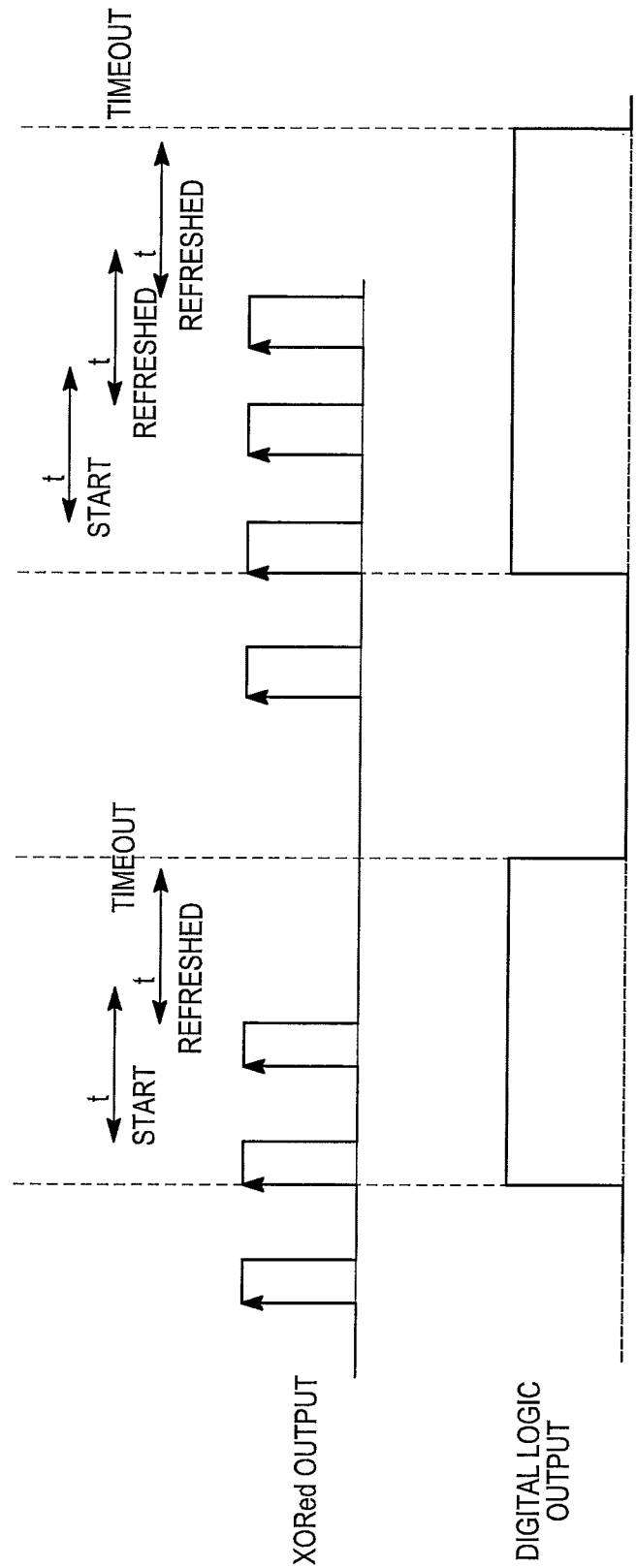
FIG. 10 is a timing diagram for a demodulator in accordance with disclosed embodiments.

Output from functional block 530 can be fed to functional block 540, which can use time delay logic to convert the train of pulses from the XORed output to logic 1. FIG. 10 is a timing diagram that depicts the processing involved in functional block 540, and, as seen in FIG. 10, at a second rising edge, the output waveform logic can be made high.

As further seen in FIG. 10, a second falling edge of the train of pulses can trigger a time delay t and keep the output waveform logic high. For example, in embodiments that employ HART FSK signals, the time delay t can be approximately 578.7 µs. If another falling edge is detected before time delay t has expired, the timer can be refreshed and reset to time delay t. When no pulses and/or rising or falling edges are detected after expiration of time delay t, the output waveform logic can be made low.

A HART FSK signal can represent 1200 bps UART (Universal Asynchronous Receiver Transmitter) data communication. Accordingly, in exemplary embodiments, the output of functional block 540 can be fed to a UART of a microcontroller. For example, the output of functional block 540, which is also the output of the smart modem 550 and of the demodulator 500, can be fed into the modulator 600 after processing the data using executable control software stored on a non-transitory computer readable medium.

As seen in FIG. 6, the HART FSK signal can be processed through the modulator 600 and pass through three functional blocks 610, 620, 630 to be modulated. For example, functional block 610 can select the FSK signal frequency. In some embodiments, the functional block 610 can receive information with instructions for when to switch the frequency of the FSK signal.

Functional block 620 can then pulse-width modulate the signal corresponding to the sine frequencies of the signal. Finally, functional block 630 can include a 2nd order passive LPF through which the signal can pass to remove high frequency switching noise.

Figure 11:
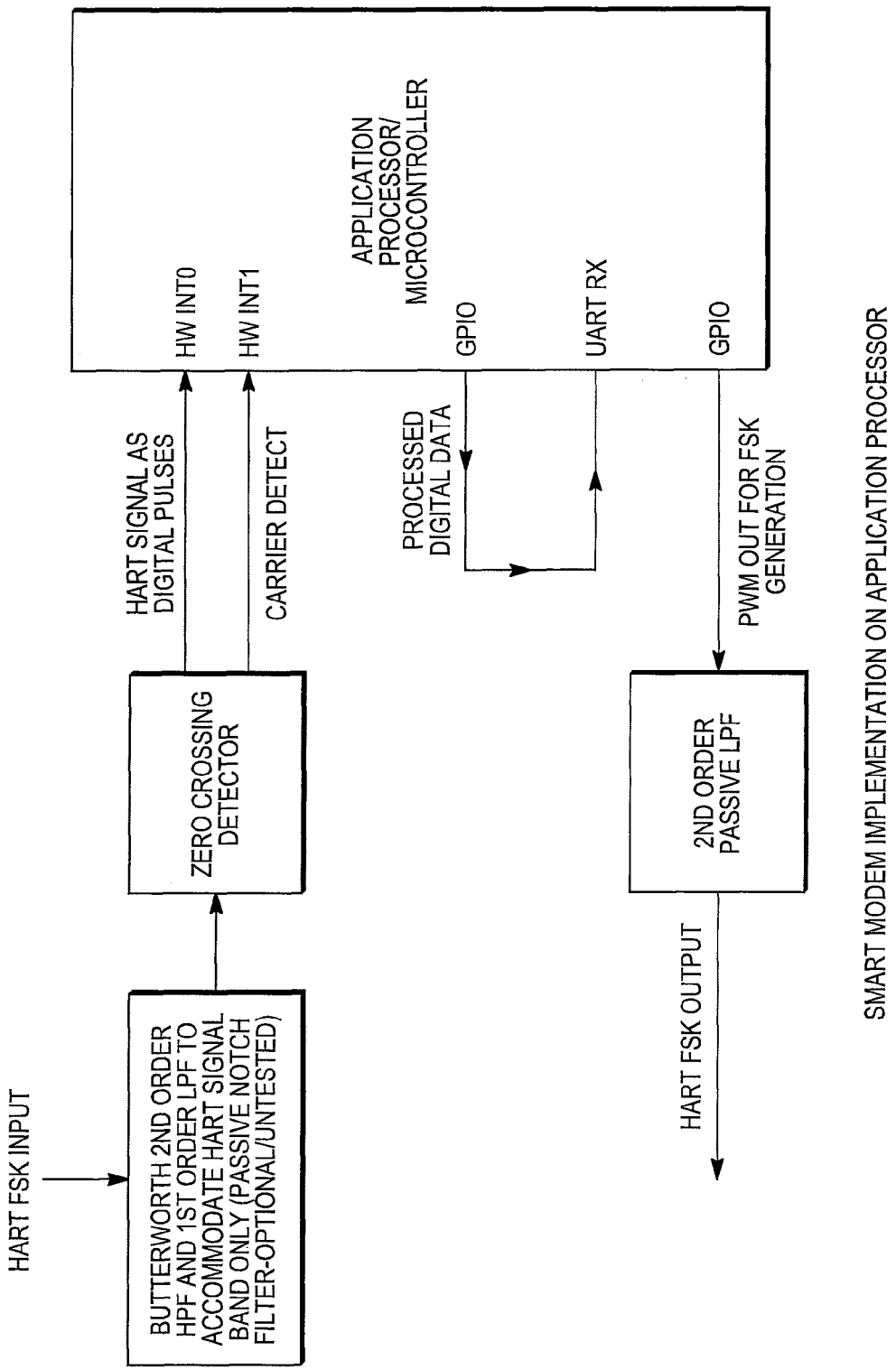
FIG. 11 is a block diagram of a smart modem implemented within an application processor in accordance with disclosed embodiments.
Figure 12:
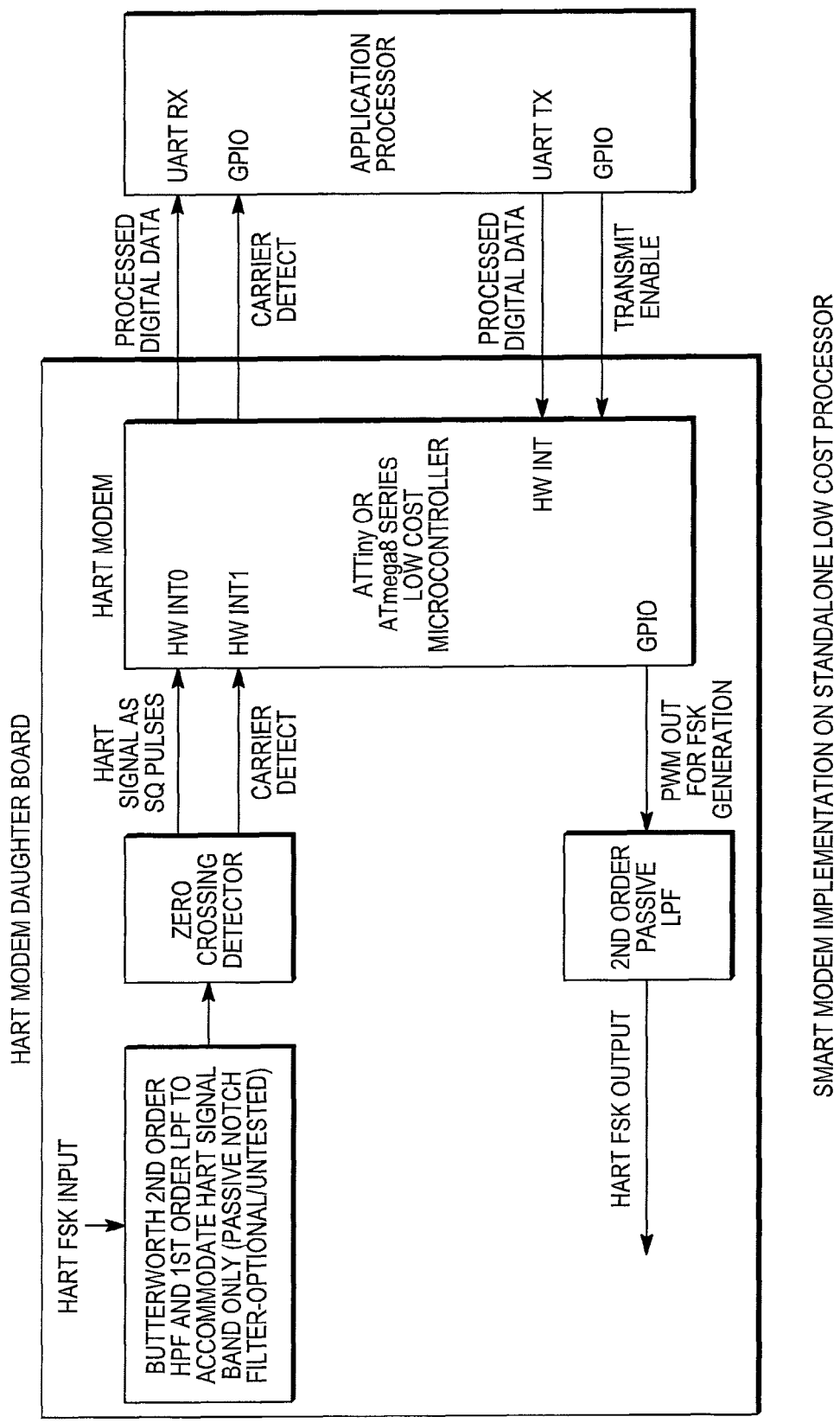
FIG. 12 is a block diagram of a smart modem implemented as a standalone modem in accordance with disclosed embodiments.

The smart modem 500 in accordance with embodiments disclosed herein can be implemented with executable control software stored on a non-transitory computer readable medium. For example, as seen in FIG. 11, the non-transitory computer readable medium can be stored on a microcontroller that is implemented in an application processor. Alternatively, as seen in FIG. 12, the non-transitory computer readable medium can be stored on a microcontroller that is implemented with as a stand-alone modem.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A method comprising:
   receiving a digital FSK (Frequency Shift Keying) signal;
   delaying a portion of the digital FSK signal;
   passing the digital FSK signal and the delayed portion of the digital FSK signal through an XOR gate; and
   converting an output of the XOR gate to digital logic.

2. The method of claim 1 wherein delaying a portion of the digital FSK signal includes delaying the digital FSK signal at a first frequency and retaining the digital FSK signal at a second frequency.

3. The method of claim 2 wherein the first frequency includes a low frequency and the second frequency includes a high frequency.

4. A method comprising:
   receiving a digital FSK (Frequency Shift Keying) signal;
   triggering a first interrupt at a rising edge of the digital FSK signal;
   when the first interrupt is triggered, updating a first variable with a state of the digital FSK signal;
   when the first interrupt is triggered, setting a timer to a predetermined delay time;
   starting the timer;
   when the timer expires, triggering a second interrupt;
   when the second interrupt is triggered, reproducing the rising edge of the digital FSK signal as a rising edge of a delayed waveform;
   when the second interrupt is triggered, updating a second variable with a state of the delayed waveform;
   passing the first variable and the second variable through an XOR gate; and
   after passing the first and second variables through the XOR gate, updating a third variable with an output of the XOR gate.

5. The method of claim 4 further comprising:
   triggering a third interrupt at a falling edge of the digital FSK signal;
   when the third interrupt is triggered, updating a fourth variable with a state of the digital FSK signal;
   when the third interrupt is triggered, setting the timer to the predetermined delay time;
   starting the timer;
   when the timer expires, triggering a fourth interrupt;
   when the fourth interrupt is triggered, reproducing the falling edge of the digital FSK signal as a falling edge of the delayed waveform;
   when the fourth interrupt is triggered, updating a fifth variable with a state of the delayed waveform;
   passing the fourth variable and the fifth variable through the XOR gate; and
   after passing the fourth and fifth variables through the XOR gate, updating a sixth variable with an output of the XOR gate.

6. The method 5 wherein receiving the digital FSK signal includes receiving the digital FSK signal having a 1200 Hz frequency.

7. The method of claim 6 wherein the output of the XOR gate includes signal having a train of pulses that varies between logic 1 and logic 0.

8. The method of claim 7 further comprising converting the signal having the train of pulses to a digital logic signal having digital logic 1.

9. The method of claim 7 further comprising, after a second rising edge in the train of pulses, setting a digital logic signal to digital logic 1.

10. The method of claim 9 further comprising, after the second falling edge in the train of pulses, setting a second timer to a time out time and starting the second timer.

11. The method of claim 10 further comprising, when a falling edge is detected before the second timer expires, resetting the second timer to the time out time.

12. The method of claim 10 further comprising, after expiration of the second timer, detecting no rising or falling edges and setting the digital logic signal to digital logic 0.

13. The method of claim 5 wherein receiving the digital FSK signal includes receiving the digital FSK signal having a 2200 Hz frequency.

14. The method of claim 13 wherein the output of the XOR gate includes a signal that remains logic 0.

15. The method of claim 4 wherein the predetermined time delay is approximately 578.7 ps.

16. An apparatus comprising:
   executable control software stored on a non-transitory computer readable medium for:
   delaying a portion of a digital FSK (Frequency Shift Keying) signal;
   determining when one, but only one of, the digital FSK signal and the delayed portion of the digital FSK signal is high;
   when one, but only one, of the digital FSK signal and the delayed portion of the digital FSK signal is high, identifying an output variable as high;
   when neither or both of the digital FSK signal and the delayed portion of the digital FSK signal is high, identifying the output variable as low; and
   converting the output variable to digital logic.

17. The apparatus of claim 16 wherein the non-transitory computer readable medium includes a microprocessor implemented in an application processor.

18. The apparatus of claim 16 wherein the non-transitory computer readable medium includes a microprocessor implemented as a standalone modem.

* * * * *